United States Patent
Bordow et al.

(10) Patent No.: US 12,143,480 B1
(45) Date of Patent: Nov. 12, 2024

(54) SYSTEMS AND METHODS FOR DISTRIBUTING SYMMETRIC KEYS VIA A QUANTUM-SECURE KEY DEPOT

(71) Applicant: Wells Fargo Bank, N.A., San Francisco, CA (US)

(72) Inventors: Peter Bordow, Fountain Hills, AZ (US); Jeff J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 346 days.

(21) Appl. No.: 17/806,672

(22) Filed: Jun. 13, 2022

(51) Int. Cl.
*H04L 9/08* (2006.01)
*H04L 9/40* (2022.01)

(52) U.S. Cl.
CPC ............ *H04L 9/0855* (2013.01); *H04L 9/083* (2013.01); *H04L 9/0869* (2013.01); *H04L 63/08* (2013.01)

(58) Field of Classification Search
CPC ..... H04L 9/0855; H04L 9/083; H04L 9/0869; H04L 63/08
See application file for complete search history.

(56) References Cited

U.S. PATENT DOCUMENTS

| | | | |
|---|---|---|---|
| 8,295,492 B2 | 10/2012 | Suarez et al. | |
| 8,494,170 B2 | 7/2013 | Kahler et al. | |
| 9,509,506 B2 * | 11/2016 | Hughes | H04L 9/3247 |
| 11,658,814 B2 * | 5/2023 | Yuan | H04L 9/0852 380/256 |
| 2008/0123855 A1 | 5/2008 | Thomas | |
| 2011/0213979 A1 | 9/2011 | Wiseman et al. | |
| 2013/0101121 A1 | 4/2013 | Nordholt et al. | |
| 2021/0288798 A1 * | 9/2021 | Vadhera | H04L 9/083 |

* cited by examiner

*Primary Examiner* — Wasika Nipa
*Assistant Examiner* — Andrew Suh
(74) *Attorney, Agent, or Firm* — K&L Gates LLP

(57) ABSTRACT

Systems, apparatuses, methods, and computer program products are disclosed for secure communication based on random key derivation. An example method includes receiving an initial symmetric key shared between the key depot device and a host device. The method also includes receiving seed data shared between the key depot device and the host device. The method also includes establishing a connection to a client device. The method also includes generating, by key derivation circuitry of the key depot device, a first symmetric key based at least on a portion of the seed data. The method also includes causing transmission of the first symmetric key to the client device. The method also includes generating a key allocation indication that identifies an authentication target and comprises an indication of the generation of the first symmetric key. The method also includes causing transmission of the key allocation indication to the host device.

14 Claims, 10 Drawing Sheets

SYSTEMS AND METHODS FOR DISTRIBUTING SYMMETRIC KEYS VIA A QUANTUM-SECURE KEY DEPOT

BACKGROUND

Symmetric keys may be shared between multiple parties in order to securely communicate and protect data. In many cases, establishment and distribution of a symmetric key is a burdensome and time-consuming process, and continuous establishment and distribution of new symmetric keys significantly increases operational overhead, costs, and security vulnerabilities.

BRIEF SUMMARY

Client devices (e.g., personal devices such as smartphones, etc.) may utilize symmetric keys for various purposes including authenticating a user, completing a transaction, and/or the like. However, these symmetric keys may be received or otherwise obtained by the client devices using existing schemas or processes which may have known vulnerabilities and may be easily exploited. In other words, symmetric keys obtained by client devices for use may not be fully trusted by users when the source of the symmetric keys is not known.

Conventional key establishment methods, such as Quantum Key Distribution (QKD), the use of pre-shared keys (PSK), or the like, establish symmetric keys between parties (e.g., Alice and Bob) to protect data. To maintain security, symmetric keys may be assigned a lifecycle. Each time symmetric key(s) reach the end of an assigned lifecycle, the key(s) must be reestablished, in that new symmetric key(s) must be generated and distributed to the parties. However, as mentioned above, due to the time-consuming and procedure-laden nature of these conventional methods, continuous establishment of new keys is not ideal. As one example, traditional key distribution processes may involve tasking a key management team with manually removing key components from a safe, designating key holders as well as security personnel to watch over the process, entering key components using dual control and split knowledge, returning key components to the aforementioned safe, and physically mailing copies of the components via separate mail channels to another key management team.

Systems, apparatuses, methods, and computer program products are disclosed herein for distributing symmetric keys via a quantum-secure key depot. Embodiments herein provide a more efficient and improved process for securely providing symmetric keys to client devices and also for maintaining secure communication between devices in the event of key lifecycle expiration. Embodiments herein avoid both the elevated risk of key exposure and the onerous key distribution processes seen in traditional implementations. Embodiments herein provide (i) a means for obtaining symmetric keys from a trusted, secure key depot leveraging quantum-based security and (ii) a lightweight and efficient key derivation process that uses seed data to continuously derive new keys for secure communication.

In one example embodiment, a method is provided that includes receiving, by communications hardware of a key depot device, an entangled particles set, wherein a corresponding entangled particles set is received by a host device. The method also includes generating, by a secure key generator of the key depot device, an initial symmetric key based on the entangled particles set, wherein the initial symmetric key facilitates secure communication between the key depot device and the host device, the host device having also generated the initial symmetric key based on the corresponding entangled particles set. The method also includes receiving, by the communications hardware of the key depot device, seed data from the host device. The method also includes establishing, by the communications hardware of the key depot device, a connection to a client device. The method also includes generating, by key derivation circuitry of the key depot device, a first symmetric key based at least on a portion of the seed data. The method also includes causing transmission, by the communications hardware of the key depot device, of the first symmetric key to the client device. The method also includes generating, by key allocation circuitry of the key depot device, a key allocation indication identifying an authentication target and comprising an indication of the generation of the first symmetric key. The method also includes causing transmission, by the communications hardware of the key depot device, of the key allocation indication to the host device.

In another example embodiment, an apparatus is provided that includes communications hardware of a key depot device configured to receive an entangled particles set, wherein a corresponding entangled particles set is received by a host device. The apparatus also includes a secure key generator configured to generate an initial symmetric key based on the entangled particles set, wherein the initial symmetric key facilitates secure communication between the key depot device and the host device, the host device having also generated the initial symmetric key based on the corresponding entangled particles set. The communications hardware is further configured to receive seed data from the host device, wherein the seed data is encrypted using the initial symmetric key. The communications hardware is further configured to establish a connection to a client device. The apparatus also includes key derivation circuitry of the key depot device configured to generate a first symmetric key based at least on a portion of the seed data. The apparatus also includes key allocation circuitry of the key depot device configured to generate a key allocation indication, wherein the key allocation indication identifies an authentication target and comprises an indication of the generation of the first symmetric key. The communications hardware of the key depot device is also configured to cause transmission of the first symmetric key to the client device and cause transmission of the key allocation indication to the host device.

In another example embodiment, a computer program product is provided that includes at least one non-transitory computer-readable storage medium storing software instructions that, when executed, cause an apparatus to receive an entangled particles set, wherein a corresponding entangled particles set is received by a host device. The instructions, when executed, further cause the apparatus to generate an initial symmetric key based on the entangled particles set, wherein the initial symmetric key facilitates secure communication between the key depot device and the host device, the host device having also generated the initial symmetric key based on the corresponding entangled particles set. The instructions, when executed, further cause the apparatus to receive seed data from the host device, wherein the seed data is encrypted using the initial symmetric key. The instructions, when executed, further cause the apparatus to establish a connection to a client device. The instructions, when executed, further cause the apparatus to generate a first symmetric key based at least on a portion of the seed data. The instructions, when executed, further cause the apparatus to cause transmission of the first symmetric key to the client device. The instructions, when executed, further cause the apparatus to generate a key allocation indication, wherein the key allocation indication identifies an authentication target and comprises an indication of the generation of the first symmetric key. The instructions, when executed, further cause the apparatus to cause transmission of the key allocation indication to the host device.

In another example embodiment, a method is provided that includes receiving, by communications hardware of a host device, an entangled particles set, wherein a corresponding entangled particles set is received by a key depot device. The method also includes generating, by a secure key generator, an initial symmetric key based on the entangled particles set, wherein the initial symmetric key facilitates secure communication between the host device and the key depot device, the key depot device having also generated the initial symmetric key based on the corresponding entangled particles set. The method also includes causing transmission, by the communications hardware of the host device, of seed data to the key depot device, wherein the seed data is encrypted using the initial symmetric key. The method also includes receiving, by the communications hardware of the host device, a key allocation indication from the key depot device, wherein the key allocation indication identifying an authentication target and comprising an indication of the generation of a first symmetric key, the first symmetric key having been generated based at least on a portion of the seed data. The method also includes deriving, in response to receiving the key allocation indication and by key derivation circuitry of the host device, the first symmetric key based on the portion of seed data. The method also includes causing, by recordation circuitry of the host device, storage of a key allocation record in a data store, the key allocation record comprising an association of the first symmetric key and the indicator associated with the authentication target.

In another example embodiment, an apparatus is provided that includes communications hardware of a host device configured to receive an entangled particles set, wherein a corresponding entangled particles set is received by a key depot device. The apparatus also includes a secure key generator configured to generate an initial symmetric key based on the entangled particles set, wherein the initial symmetric key facilitates secure communication between the host device and the key depot device, the key depot device having also generated the initial symmetric key based on the corresponding entangled particles set. The communications hardware is also configured to cause transmission of seed data to the key depot device, wherein the seed data is encrypted using the initial symmetric key. The communications hardware is also configured to receive a key allocation indication from the key depot device, wherein the key allocation indication identifies an authentication target and comprises an indication of a generation of a first symmetric key, the first symmetric key having been generated based at least on a portion of the seed data. The apparatus also includes key derivation circuitry of the host device configured to derive, in response to receiving the key allocation indication, the first symmetric key based on the portion of seed data. The apparatus also includes key allocation circuitry of the host device configured to cause storage of a key allocation record in a data store, the key allocation record comprising an association of the first symmetric key and the indicator associated with the authentication target.

In another embodiment, a computer program product is provided that comprises at least one non-transitory computer-readable storage medium storing software instructions that, when executed, cause an apparatus to receive an entangled particles set, wherein a corresponding entangled particles set is received by a key depot device. The instructions, when executed, also cause the apparatus to generate an initial symmetric key based on the entangled particles set, wherein the initial symmetric key facilitates secure communication with the key depot device, the key depot device having also generated the initial symmetric key based on the corresponding entangled particles set. The instructions, when executed, also cause the apparatus to cause transmission of seed data to the key depot device, wherein the seed data is encrypted using the initial symmetric key. The instructions, when executed, also cause the apparatus to receive a key allocation indication from the key depot device, wherein the key allocation indication identifies an authentication target and comprises an indication of a generation of a first symmetric key, the first symmetric key having been generated based at least on a portion of the seed data. The instructions, when executed, also cause the apparatus to, in response to receiving the key allocation indication, derive the first symmetric key based on the portion of seed data. The instructions, when executed, also cause the apparatus to cause storage of a key allocation record in a data store, the key allocation record comprising an association of the first symmetric key and the indicator associated with the authentication target.

In another example embodiment, a method is provided that includes receiving, by communications hardware of a key depot device, an entangled particles set, wherein a corresponding entangled particles set is received by a host device. The method also includes generating, by a secure key generator of the key depot device, an initial symmetric key based on the entangled particles set, the initial symmetric key facilitating secure communication between the key depot device and the host device, the host device having also generated the initial symmetric key based on the corresponding entangled particles set. The method also includes receiving, by the communications hardware of the key depot device, seed data from the host device, wherein the seed data is encrypted using the initial symmetric key. The method also includes, in response to an occurrence of a triggering condition associated with the initial symmetric key, deriving, by key derivation circuitry of the key depot device, a second symmetric key based on a portion of the seed data. The method also includes performing, by data protection circuitry of the key depot device, a cryptographic data protection action using the second symmetric key, the second symmetric key facilitating the secure communication between the key depot device and the host device, the host device having also derived the second symmetric key based on the portion of the seed data.

In another example embodiment, an apparatus is provided that includes communications hardware of a key depot device configured to receive an entangled particles set, wherein a corresponding entangled particles set is received by a host device. The apparatus also includes a secure key generator configured to generate initial symmetric key based on the entangled particles set, wherein the initial symmetric key facilitates secure communication between the key depot device and the host device, the host device having also generated the initial symmetric key based on the corresponding entangled particles set. The communications hardware is also configured to receive seed data from the host device, wherein the seed data is encrypted using the initial symmetric key. The apparatus also includes key derivation circuitry of the key depot device configured to derive, in response to an occurrence of a triggering condition associated with the initial symmetric key, a second symmetric key based on a portion of the seed data. The apparatus also includes data protection circuitry of the key depot device configured to perform a cryptographic data protection action using the second symmetric key, wherein the second symmetric key facilitates the secure communication between the key depot device and the host device, the host device having also derived the second symmetric key based on the portion of the seed data.

In another example embodiment, a computer program product is provided that includes at least one non-transitory computer-readable storage medium storing software instructions that, when executed, cause an apparatus to receive an entangled particles set at a key depot device, wherein a corresponding entangled particles set is received by a host device. The instructions, when executed, also cause the apparatus to generate an initial symmetric key based on the entangled particles set, wherein the initial symmetric key facilitates secure communication between the key depot device and the host device, the host device having also generated the initial symmetric key based on the corresponding entangled particles set. The instructions, when executed, also cause the apparatus to receive seed data from the host device, wherein the seed data is encrypted using the initial symmetric key. The instructions, when executed, also cause the apparatus to derive, in response to an occurrence of a triggering condition associated with the initial symmetric key, a second symmetric key based on a portion of the seed data. The instructions, when executed, also cause the apparatus to perform a cryptographic data protection action using the second symmetric key, wherein the second symmetric key facilitates the secure communication between the key depot device and the host device, the host device having also derived the second symmetric key based on the portion of the seed data.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
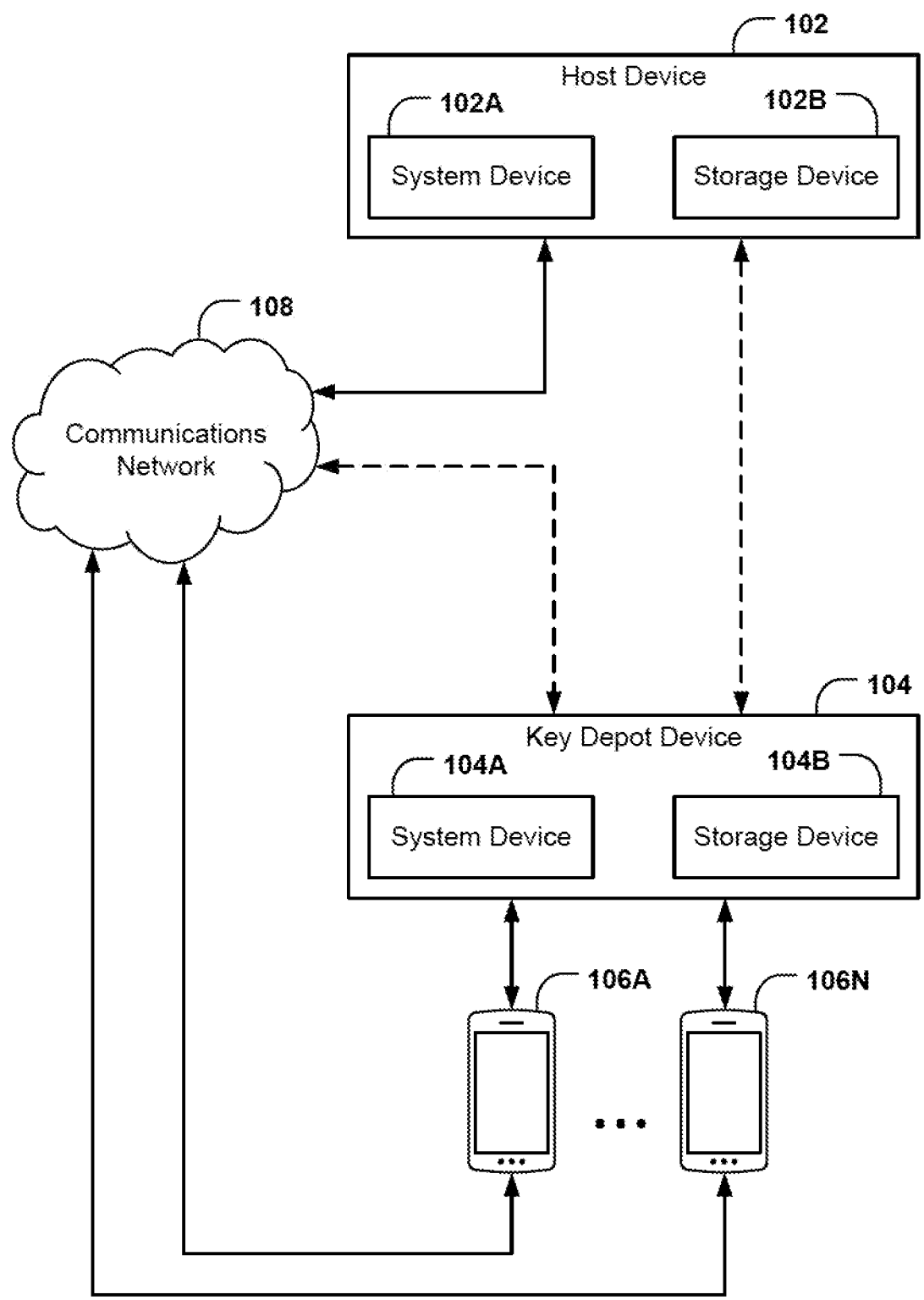
FIG. 1 illustrates a system in which some example embodiments may be used.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, methods, apparatuses, systems, and computer program products are described herein that provide for distributing symmetric keys via a quantum-secure key depot. As mentioned above, users perform various actions with their personal devices (e.g., conduct ecommerce and in-person transactions, enter sensitive information to gain access to online accounts, etc.) and these actions often involve use of a symmetric key to protect the user's data from intruders. A user may utilize a wide variety of mobile applications, websites, and/or the like to conduct ecommerce transactions, each of which may have different ways of protecting data and some of which may be significantly less secure than others. With the rise in data breaches, ransomware attacks, and the like, users may find themselves unable to trust organizations to protect their data. For instance, users are often unaware of the measures taken to protect their data. In this regard, users are unsure of the type of cryptographic symmetric keys used to encrypt their data and the source of the symmetric keys (e.g., where and how the symmetric keys are derived).

Additionally, it has traditionally been very burdensome (both computationally and physically) to maintain secure communications between multiple parties (e.g., devices, systems, or the like). Some examples of traditional key distribution processes involve distributing pre-shared keys (PSK) or distributing keys derived using quantum mechanics, one example being Quantum Key Distribution (QKD).

In a traditional QKD implementation, a QKD device generates two streams of quantum entangled particles (e.g., photons) and sends one stream to a first device (Alice) and another to a second device (Bob). Typically, one of the participants manages the QKD device, but it could be managed by a third party. Alice and Bob both read the received entangled particles, interpreting the same string of binary zeroes and ones. Alice and Bob can use a separate communications channel to statically verify that they have read and interpreted the entangled particles correctly. A device reading any photon will affect the state of that photon, so through a variety of operations, Alice and Bob are able to determine whether an attacker (e.g., Eve) using a third device has eavesdropped on any of the transmitted photons. As a result, Alice and Bob are able to use only photons that were not eavesdropped on as the basis for generation of a key known only to each other. That key can then be used for secure communications.

Other methods of key distribution may also be used. For example, in many instances, secret keys are injected into devices within a Key Injection Facility (KIF), which is a physically secure room. After receipt of one or more secret keys within a KIF, a device can thereafter be shipped to remote locations where it can utilize the injected secret keys. To facilitate this process, such devices often include a Secure Cryptographic Device (SCD) that provides physically and logically protected cryptographic services and storage (e.g., a PIN entry device (PED) or Hardware Security Module (HSM)) into which the secret key(s) are injected. For instance, an SCD (e.g., an encryption personal identification number (PIN) pad (EPP)) may be integrated into a larger system such as an automated teller machine (ATM) or point-of-sale (POS) terminal, and after injection of one or more secret keys into the integrated SCD, the larger system may thereafter be deployed to its ultimate destination for use in commerce.

Another common method for distributing keys uses a SCD as a portable Key Loading Device (KLD), which is a mobile device that can physically transport and inject keys outside of a key injection facility (KIF). Keys are prepared and transferred from a secure cryptographic device (SCD) to the KLD within the KIF. The KLD is then physically transported to a remote device and the prepared keys are transferred to the SCD of the remote device. Thus, secure communication between the remote device and a host device may be established.

Once a key distribution process takes place (e.g., QKD), Alice and Bob then have a key, known only to Alice and Bob, which can be used to perform various cryptographic data protection actions. For instance, example cryptographic data protection actions may include encrypting data using the key and decrypting the data using the key (e.g., Bob may decrypt data using the key after receiving the data from Alice, who encrypted the data using the key). After some predefined time has elapsed, and/or after the key has been used to perform a predefined number of cryptographic data protection actions, the lifecycle of the key may expire, and thus a new key is required to be established and distributed to Alice and Bob in order for the devices to maintain secure communications and the ability to perform cryptographic data protection actions. Conventionally, the key distribution process (e.g., QKD) is repeated, and a new key is issued to the devices. However, as the examples above illustrate, QKD and related key distribution processes are often complex and onerous. Thus, continuously establishing and distributing new keys when keys expire in order to maintain secure communications between multiple parties results in an exponentially burdensome experience that is extremely prone to human error. Keys assigned short lifecycles (e.g., 24 hours, 1 hour, 10 minutes, and/or less than 25 utilizations, for example) further compound this issue and make continuous execution of key distribution processes almost, if not completely, unfeasible.

In contrast to these conventional techniques, example embodiments described herein provide both (i) a secure means for obtaining symmetric keys from a trusted, quantum-secure key depot and (ii) a lightweight and efficient symmetric key derivation process using seed data to continuously derive new keys for secure communication. Regarding (i), embodiments herein provide a quantum-secure key depot device that is physically accessible to users and able to securely connect to client devices to distribute symmetric keys, which may be used for various purposes by the client devices. The key depot may be in communication with a host device and securely communicate with the host device using a symmetric key securely obtained through a quantum-based process (e.g., QKD). The devices may both utilize seed data to derive symmetric keys to be distributed to client devices. In this regard, the key depot device may allocate a portion of the seed data to generate a symmetric key a particular client device, and send a lightweight indication to the host device notifying the host device of the particular client device which is receiving a key and of the generation of the symmetric key (but not the key itself). The host device may be configured to automatically determine the portion of seed data used by the key depot for the symmetric key and derive the symmetric key itself. By leveraging quantum-based security, the key depot provides a means for users to securely acquire symmetric keys. Regarding (ii), the key depot device and the host device may also utilize the seed data obtained in a quantum-secure manner to derive new symmetric keys to use for communications between the host device and the key depot device, thereby avoiding continuous executions of time-consuming key distribution processes.

Accordingly, the present disclosure sets forth systems, methods, and apparatuses that provide for distributing symmetric keys via a quantum-secure key depot. There are many advantages of these and other embodiments described herein. For instance, embodiments herein decrease operational overhead, costs, and the likelihood of security issues and human error by avoiding continuous execution of key distribution processes. In addition, by only needing to receive a lightweight key allocation indication from the key depot device that includes an indication of the client device receiving a symmetric key, embodiments herein can operate within extremely low bandwidth environments or during intermittent connections. Finally, security of communications between devices is enhanced, in that while the generation of new keys is streamlined and more efficient, additional complexity is added by way of the seed data, making it more difficult for bad actors to gain knowledge of any keys derived by the system.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment within which various embodiments may operate. As illustrated, the environment may include a host device 102 which may include a system device 102A in communication with a storage device 102B. The environment may also include other computing devices, such as a key depot device 104, which may also include a system device 104A in communication with a storage device 104B. Although system devices 102A and 104A and storage devices 102B and 104B are described in singular form, computing devices in some embodiments may utilize more than one system device and/or more than one storage device. Additionally, in some embodiments, the computing devices 102 and 104 may not require a storage device at all. Whatever the implementation, the host device 102 and key depot device 104, and their constituent system device(s) 102A and 104A and/or storage device (s) 102B and 104B may receive and/or transmit information via communications network 108 (e.g., the Internet) with any number of other devices, such as one or more client devices 106A-106N.

System devices 102A and 104A may be implemented as one or more servers, which may or may not be physically proximate to other components of their respective computing devices (e.g., host device 102 and key depot device 104). Furthermore, some components of system devices 102A and 104A may be physically proximate to the other components of their respective computing devices while other components are not. System devices 102A and 104A may receive, process, generate, and transmit data, signals, and electronic information to facilitate the operations of host device 102 and key depot device 104. Particular components of system devices 102A and 104A are described in greater detail below with reference to apparatus 200 in connection with FIG. 2.

Storage devices 102B and 104B may comprise distinct components from system devices 102A and 104A, or may comprise an element of system devices 102A and 104A (e.g., memory 204, as described below in connection with FIG. 2). Storage devices 102B and 104B may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage devices 102B and 104B may host the software executed to operate the host device 102 and key depot device 104, respectively. Storage devices 102B and 104B may store information relied upon during operation of the host device and key depot device, such as seed data and/or other information that may be used by the host device and key depot device, data to be analyzed by the host device and/or key depot device, or the like. In addition, storage devices 102B and 104B may store control signals, device characteristics, and access credentials enabling interaction between the host device 102 and key depot device 104 and one or more client devices 106A-106N.

The host device 102 and key depot device 104 may be embodied by any computing devices known in the art, such as desktop or laptop computers, tablet devices, smartphones, server devices (e.g., a secure data center or other device hosted within the secure network infrastructure of an organization or entity), Automated Teller Machines (ATMs), point-of-sale (POS) devices, or the like. Moreover, the host device 102 and key depot device 104 need not themselves be independent devices, but may be peripheral devices communicatively coupled to other computing devices.

Example Implementing Apparatuses

Figure 2:
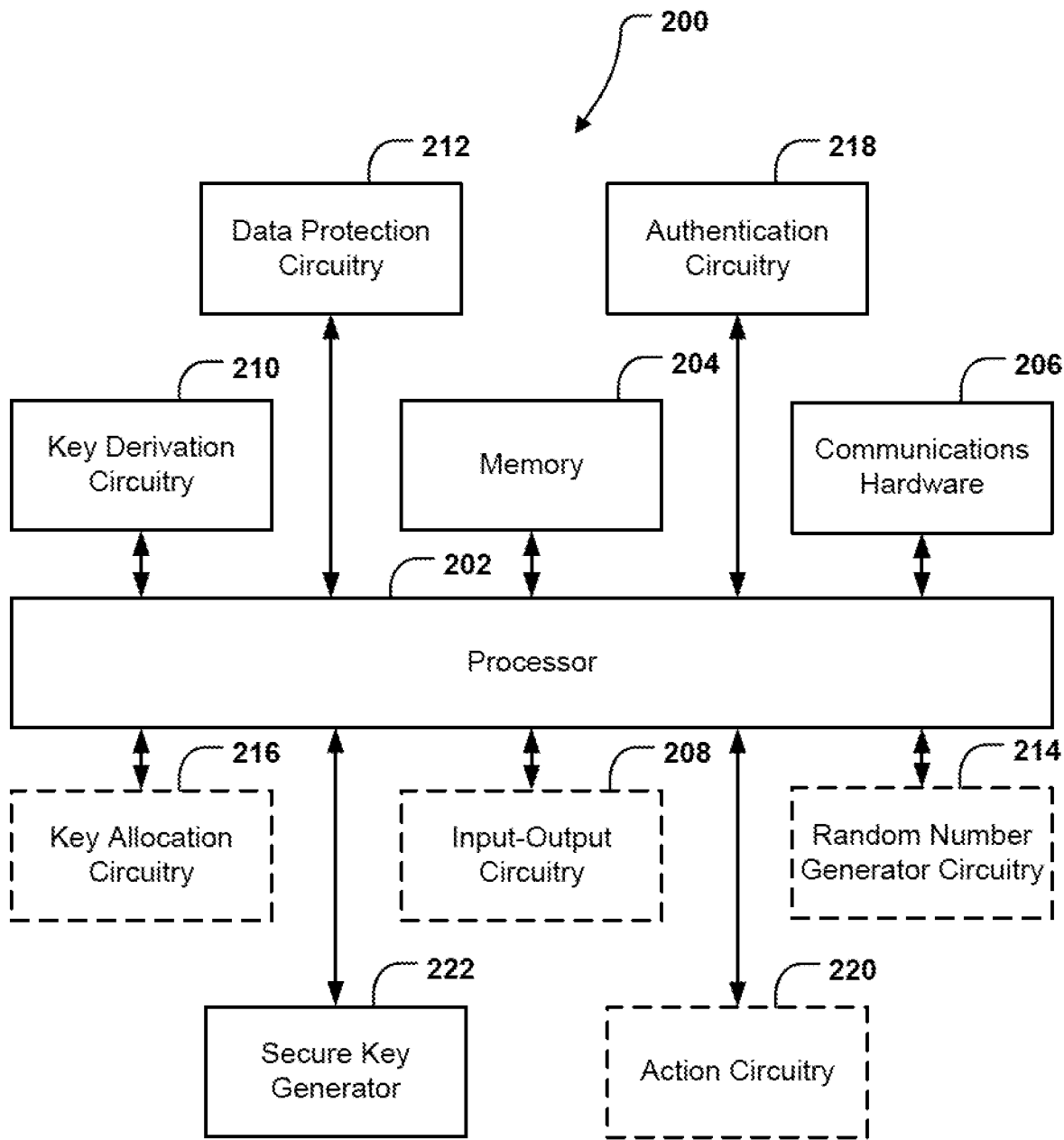
FIG. 2 illustrates a schematic block diagram of example circuitry embodying a device that may perform various operations in accordance with some example embodiments described herein.

System device 102A of the host device 102 and system device 104A of the key depot device 104 (described previously with reference to FIG. 1) may each be embodied by one or more computing devices or servers, shown as apparatus 200 in FIG. 2. As illustrated in FIG. 2, the apparatus 200 may include processor 202, memory 204, communications hardware 206, input-output circuitry 208, key derivation circuitry 210, data protection circuitry 212, random number generator circuitry 214, key allocation circuitry 216, authentication circuitry 218, and action circuitry 220, each of which will be described in greater detail below. While the various components are only illustrated in FIG. 2 as being connected with processor 202, it will be understood that the apparatus 200 may further comprise a bus (not expressly shown in FIG. 2) for passing information amongst any combination of the various components of the apparatus 200. The apparatus 200 may be configured to execute various operations described above in connection with FIG. 1 and below in connection with FIGS. 3A-7.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device (e.g., storage device 102B and/or storage device 104B), as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processor for causing transmission of such signals to a network or for handling receipt of signals received from a network. In some embodiments, the communications hardware 206 may include, for example, interfaces such as one or more ports (e.g., a laser port, a fiber-optic cable port, and/or the like) for enabling communications with other devices.

The apparatus 200 may include input-output circuitry 208 configured to provide output to a user and, in some embodiments, to receive an indication of user input. It will be noted that some embodiments will not include input-output circuitry 208, in which case user input may be received via a separate device such as a separate client device or the like. The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises key derivation circuitry 210 that generates symmetric keys (e.g., using seed data). The key derivation circuitry 210 may utilize processor 202, memory 204, or any other hardware component included in the apparatus 200 to perform these operations, as described in connection with FIGS. 3A-7 below. The key derivation circuitry 210 may further utilize communications hardware 206 to gather data from a variety of sources, may utilize input-output circuitry 208 to receive data from a user, and in some embodiments may utilize processor 202 and/or memory 204 to derive symmetric keys based on seed data.

In addition, the apparatus 200 further comprises data protection circuitry 212 that performs cryptographic data protection actions using symmetric keys. The data protection circuitry 212 may utilize processor 202, memory 204, or any other hardware component included in the apparatus 200 to perform these operations, as described in connection with FIGS. 3A-7 below. The data protection circuitry 212 may further utilize communications hardware 206 to gather data from a variety of sources, may utilize input-output circuitry 208 to receive data from a user, and in some embodiments may utilize processor 202 and/or memory 204 to encrypt data using a symmetric key, decrypt encrypted data using a symmetric key, and/or perform other cryptographic data protection actions.

In some embodiments, the apparatus 200 may optionally also comprise random number generator circuitry 214 that generates seed data (e.g., a random or truly random number). In this regard, the random number generator circuitry 214 may comprise a random number generator (RNG) or, in some embodiments, a quantum random number generator (QRNG). The random number generator circuitry 214 may utilize processor 202, memory 204, or any other hardware component included in the apparatus 200 to perform these operations, as described in connection with FIGS. 3A-7 below. The random number generator circuitry 214 may further utilize communications hardware 206 to gather data from a variety of sources, may utilize input-output circuitry 208 to receive data from a user, and in some embodiments may utilize processor 202 and/or memory 204 to generate seed data.

In some embodiments, the apparatus 200 may optionally also comprise key allocation circuitry 216 that generates a key allocation indication. The key allocation circuitry 216 may utilize processor 202, memory 204, or any other hardware component included in the apparatus 200 to perform these operations, as described in connection with FIGS. 3A-7 below. The key allocation circuitry 216 may further utilize communications hardware 206 to gather data from a variety of sources (e.g., storage device 102B or 104B, as shown in FIG. 1), may utilize input-output circuitry 208 to receive data from a user, and in some embodiments may utilize processor 202 and/or memory 204 to generate and populate a key allocation indication.

Additionally, the apparatus 200 also comprises authentication circuitry 218 that authenticates an authentication target and determines an authentication result based on a candidate symmetric key and an identified key allocation record. The authentication circuitry 218 may utilize processor 202, memory 204, or any other hardware component included in the apparatus 200 to perform these operations, as described in connection with FIGS. 3A-7 below. The authentication circuitry 218 may further utilize communications hardware 206 to gather data from a variety of sources (e.g., storage device 102B or 104B, as shown in FIG. 1), may utilize input-output circuitry 208 to receive data from a user, and in some embodiments may utilize processor 202 and/or memory 204 to authenticate an authentication target, hash portions of seed data, and compare hashes of seed data.

In addition, in some embodiments, the apparatus 200 may optionally further comprise action circuitry 220 that performs actions of an action set. The action circuitry 220 may utilize processor 202, memory 204, or any other hardware component included in the apparatus 200 to perform these operations, as described in connection with FIGS. 3A-7 below. The action circuitry 220 may further utilize communications hardware 206 to gather data from a variety of sources (e.g., client device(s) 106A-106N, as shown in FIG. 1), may utilize input-output circuitry 208 to receive data from a user, and in some embodiments may utilize processor 202 and/or memory 204 to perform an action of an action set.

In addition, the apparatus 200 also comprises a secure key generator 222 that generates a symmetric key based on an entangled particles set. The secure key generator 222 may utilize processor 202, memory 204, or any other hardware component included in the apparatus 300 to perform these operations, as described in connection with FIGS. 3A-7 below. The secure key generator 222 may further utilize communications hardware 206 to gather data from a variety of sources (e.g., a key distribution device), may utilize input-output circuitry 208 to receive data from a user, and in some embodiments may utilize processor 202 and/or memory 204 to measure entangled particles of an entangled particles set and generate a symmetric key (e.g., an initial symmetric key) based on the measurement of the entangled particles. The secure key generator 222 may be any means such as one or more devices or circuitry embodied in either hardware or a combination of hardware and software that is configured to measure entangled particles and generate cryptographic keys. The entangled particles may be measured to facilitate distribution of true random numbers to devices (thereby each obtaining copies of true random number sequences).

Although components 202-222 are described in part using functional language, it will be understood that the particular implementations necessarily include the use of particular hardware. It should also be understood that certain of these components 202-222 may include similar or common hardware. For example, the key derivation circuitry 210, data protection circuitry 212, random number generator circuitry 214, key allocation circuitry 216, authentication circuitry 218, action circuitry 220, and secure key generator 222 may each at times leverage use of the processor 202, memory 204, communications hardware 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the key derivation circuitry 210, data protection circuitry 212, random number generator circuitry 214, key allocation circuitry 216, authentication circuitry 218, action circuitry 220, and secure key generator 222 may leverage processor 202, memory 204, communications hardware 206, or input-output circuitry 208 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, communications hardware 206 or input-output circuitry 208 for enabling any functions not performed by special-purpose hardware elements. In all embodiments, however, it will be understood that the key derivation circuitry 210, data protection circuitry 212, random number generator circuitry 214, key allocation circuitry 216, authentication circuitry 218, action circuitry 220, and secure key generator 222 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the apparatus 200. Thus, some or all of the functionality described herein may be provided by third party circuitry. For example, apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of flowcharts.

Example Operations

Turning to FIGS. 3A-7, example flowcharts are illustrated that contain example operations implemented by example embodiments described herein. The various operations illustrated in FIGS. 3A-7 may, for example, be performed by system device 102A of the host device 102 or system device 102B of the key depot device 104 shown in FIG. 1, each of which may in turn be embodied by an apparatus 200, which is shown and described in connection with FIG. 2. To perform the operations described below, the apparatus 200 may utilize one or more of processor 202, memory 204, communications hardware 206, input-output circuitry 208, key derivation circuitry 210, data protection circuitry 212, random number generator circuitry 214, key allocation circuitry 216, authentication circuitry 218, action circuitry 220, and/or any combination thereof. It will be understood that user interaction with the key depot device 104 (or host device 102) may occur directly via input-output circuitry 208, or may instead be facilitated by a separate client device or the like, and which may have similar or equivalent physical componentry facilitating such user interaction.

Figure 3A:
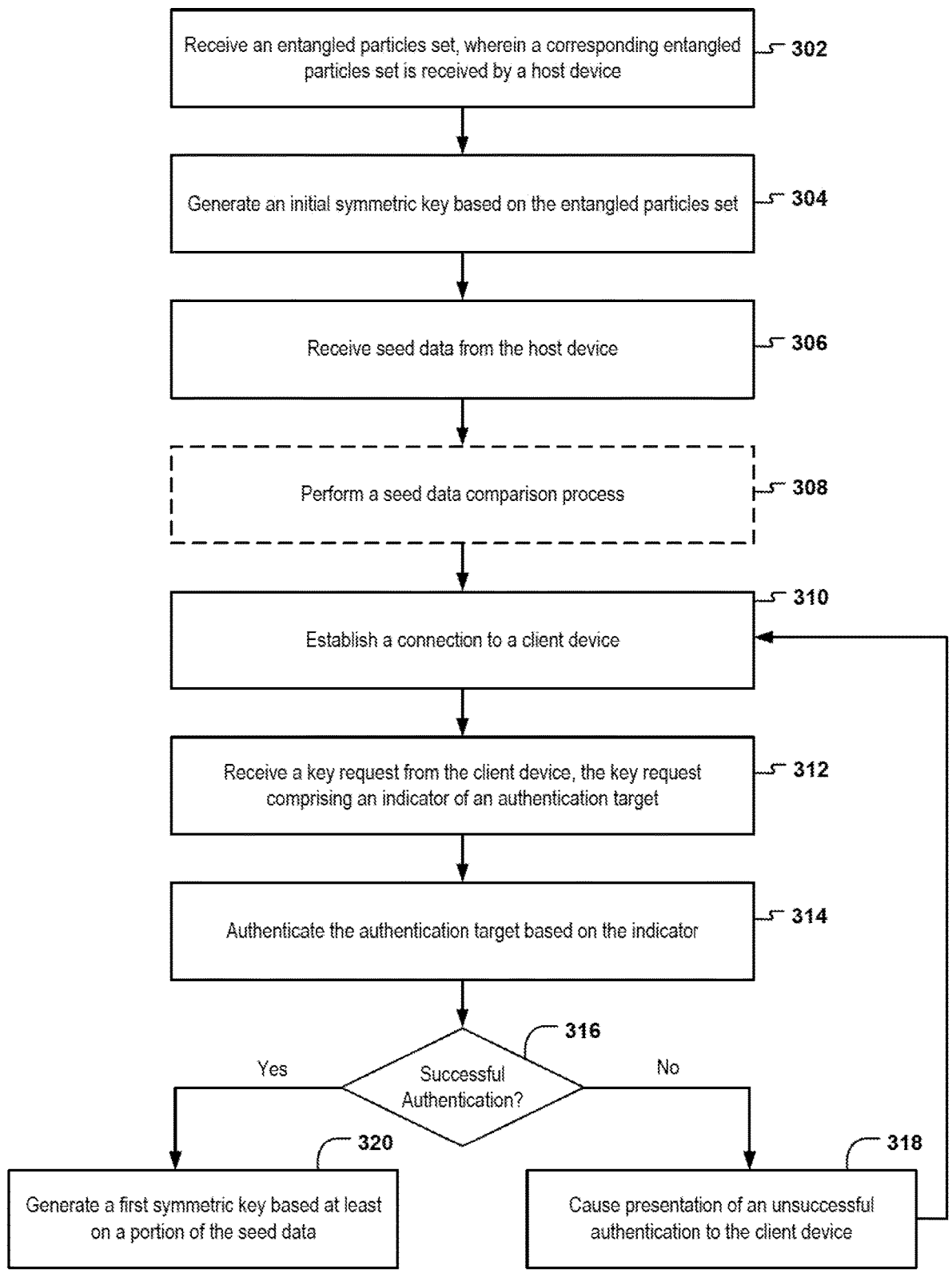
FIG. 3A illustrates an example flowchart of operations performed by a key depot device to securely distribute symmetric keys, in accordance with some example embodiments described herein.

Turning first to FIG. 3A, example operations (e.g., as performed by a key depot device 104) are shown for securely distributing symmetric keys.

As shown by operation 302, the apparatus 200 includes means, such as processor 202, memory 204, communications hardware 206, or the like, for receiving an entangled particles set. In this regard, the key depot device may receive an entangled particles set, and a host device may receive a corresponding entangled particles set, such that measuring the entangled particles of the entangled particles set at each device may result in the devices obtaining the same initial symmetric key.

In some embodiments, the entangled particles set may be distributed to the key depot device and the host device via a key distribution process, such as QKD as described above. For example, corresponding entangled particles sets may be distributed to the host device 102 and the key depot device 104 via a portable key distribution device.

In some embodiments, a key distribution device may be embodied by various storage devices known in the art. For instance, the key distribution device may comprise a key loader device (KLD) used to load entangled particles and/or cryptographic keys into electronic devices. In some embodiments, the key distribution device may comprise a mobile quantum key distribution (MQKD) device, as disclosed in U.S. patent application Ser. No. 17/451,800, the entirety of which is incorporated herein by reference. In some embodiments, the key distribution device may include one or more connection ports or the like suitable to transmit entangled particles (e.g., in embodiments in which QKD serves as the initial key distribution process). For example, the key distribution device may comprise a connection port for a fiber-optic cable and/or a laser port. More broadly, a key distribution device may include connection ports of one kind or another that are suitable to inject data (e.g., quantum-entangled particles, symmetric keys, and/or the like) into devices (e.g., host device 102 and key depot device 104) which may or may not be quantum-enabled (e.g., able to receive and process quantum entangled particles).

In some embodiments, the key depot device 104 may be a stationary device installed at a fixed location (e.g., an automated teller machine (ATM), point-of-sale (POS) terminal, or the like). In this regard, the key depot device 104 may receive the entangled particles set from a key distribution device at an installed location of the key depot device (e.g., a bank branch or other establishment at which the key depot device is installed). In some embodiments, the entangled particles set may be received via a direct connection between the key distribution device and the key depot device 104. Similarly, the host device 102 may also receive a corresponding entangled particles set via a separate direct connection to the key distribution device As shown by operation 304, the apparatus includes means, such as processor 202, memory 204, secure key generator 222, or the like, for generating an initial symmetric key based on the entangled particles set. In this regard, the entangled particles set may be measured by the secure key generator 222 of the key depot device to establish an initial symmetric key . . . .

As shown by operation 306, the apparatus 200 includes means, such as processor 202, memory 204, communications hardware 206, or the like, for receiving seed data from the host device. In some embodiments, the seed data may comprise a random number (e.g., a random string of entropy bits (e.g., a string of binary zeroes and ones)). The random number may be generated using a random number generator (e.g., random number generator circuitry 214) of the host device. In some embodiments, the random number generator may be a QRNG, in which case the seed data would comprise a truly random number.

In some embodiments, the seed data may be generated by the host device 102 and transmitted to the key depot device 104. In some other embodiments, the seed data may be generated by and received from a third-party device, such as a dedicated random number generation device or the like. For example, in some embodiments, the third-party device may be operated by a cloud-based service which supplies truly random numbers via quantum random number generation.

In some embodiments, the seed data may be transmitted to the host device and the key depot device in response to a request from at least one of the devices. For instance, upon receiving the initial symmetric key, at least one of the host device 102 and key depot device 104 may cause transmission of a request for the seed data to the third-party device. In this regard, the apparatus 200 includes means, such as processor 202, memory 204, communications hardware 206, or the like, for causing transmission of a request for seed data. The request may include an indication of the device(s) (e.g., a device identifier, IP address, or the like) to which the seed data should be sent. For example, the host device 102 may send a request to the third-party device requesting seed data (in the form of a truly random number) be transmitted to the host device 102 and the key depot device 104. Alternatively, the host device 102 may send a request to the third-party device requesting seed data be transmitted to just the host device 102, and once received, the host device may encrypt the seed data using the initial symmetric key and subsequently cause transmission of the encrypted seed data to the key depot device 104.

In some embodiments, one of the host device or the key depot device may generate the seed data and cause transmission of the seed data to the other device. For example, upon receiving the initial symmetric key, the host device 102 may generate the seed data. In this regard, the apparatus 200 may include means, such as such as processor 202, memory 204, random number generator circuitry 214, or the like, for generating the seed data. The host device 102 may then share the seed data with the key depot device 104, such that both devices obtain the seed data. In this regard, the apparatus 200 includes means, such as such as processor 202, memory 204, communications hardware 206, or the like, for causing transmission of the seed data.

In some embodiments, the host device 102 may encrypt the seed data using the initial symmetric key prior to sending the seed data to the key depot device 104. In this regard, the apparatus 200 includes means, such as processor 202, memory 204, data protection circuitry 212, or the like, for encrypting the seed data using the initial symmetric key prior to causing transmission of the seed data to the key depot device. Upon receiving the encrypted seed data, the key depot device may then decrypt the seed data using the initial symmetric key. In this regard, the apparatus 200 includes means, such as processor 202, memory 204, data protection circuitry 212, or the like, for decrypting the seed data using the initial symmetric key.

Once the host device 102 and the key depot device 104 each receive the seed data, an optional confirmation step may be performed to ensure that both of the devices have obtained the same seed data (e.g., the same truly random number). In this regard, as shown by operation 308, the apparatus 200 may include means, such as processor 202, memory 204, authentication circuitry 218, or the like, for performing a seed data comparison process. As one example, in some embodiments, the key depot device 104 may cause transmission of a portion (e.g., a subset) of the seed data received at the key depot device 104 to the host device 102. The host device 102 may then compare the received portion to the portion of the seed data received at (or generated by) the host device 102 to confirm whether the portions match. To do this, the apparatus 200 may include means, such as processor 202, memory 204, authentication circuitry 218, or the like, for comparing at least a portion of first seed data with at least a portion of second seed data. In an instance in which the portions match, it may be assumed that the rest of the seed data matches as well. In some embodiments, the host device 102 may then send a confirmation message or the like to the key depot device 104 confirming that the portions match. In this regard, the apparatus 200 includes means, such as such as processor 202, memory 204, communications hardware 206, or the like, for causing transmission of a confirmation message. In an instance in which the portions do not match, the confirmation message may indicate that the portions do not match.

In this case, at least one of the devices may then request new seed data from the third-party device (or alternatively, generate new seed data and cause transmission of the new seed data to the other device).

It is to be appreciated that the seed data comparison process may comprise other means of comparing the seed data received by each of the devices. For example, in some embodiments, this may involve hashes of the received seed data (or portions thereof) may be generated and the hashes may be compared. In this regard, the apparatus 200 may include means, such as processor 202, memory 204, authentication circuitry 218, or the like, for hashing at least a portion of seed data. For example, the hashing may be performed using any hashing algorithm or the like known in the art. The apparatus 200 may also include means, such as processor 202, memory 204, authentication circuitry 218, or the like, for comparing a first hash and a second hash. For example, the first hash may comprise a hash of the seed data obtained by the host device 102, and the second hash may comprise a hash of the seed data obtained by the key depot device 104. In an instance in which the hashes match, a confirmation message confirming that the hashes match may be transmitted. For example, the host device 102 may then send a confirmation message or the like to the key depot device 104 confirming that the hashes match. In an instance in which the hashes do not match, the confirmation message may indicate that the hashes do not match. In this case, at least one of the devices may then request new seed data from the third-party device (or alternatively, generate new seed data and cause transmission of the new seed data to the other device).

In some embodiments, the key depot device 104 may be a stationary device that is installed at a fixed location. For example, the key depot device 104 may be installed within a banking branch or the like. In this regard, the key depot device 104 may be fixed in a manner which allows users (e.g., customers of the bank) to directly utilize the key depot device. For instance, a user may approach the key depot device, connect their personal client device to the key depot device, and securely obtain one or more symmetric keys. As shown by operation 310, the apparatus 200 includes means, such as processor 202, memory 204, communications hardware 206, or the like, for establishing a connection to a client device.

In some embodiments, a user may connect a client device to the key depot device via a physical connection (e.g., a physical wire) or may connect the client device to the key depot device using a secure wireless connection (e.g., near-field communication (NFC) or the like).

In some embodiments, establishing a connection to a client device may involve an authentication of the client device or a user associated with the client device. To perform an authentication, the key depot device 104 may first receive a key request from the client device. The key request may indicate that the client device is requesting one or more symmetric keys from the key depot device for a specific authentication target. The authentication target may be the client device itself (e.g., such that the symmetric key would be used to authenticate the client device in future operations) or a user of the client device (e.g., such that the symmetric key would be used to authenticate the specific user in future operations). As shown by operation 312, the apparatus 200 includes means, such as processor 202, memory 204, communications hardware 206, or the like, for receiving a key request from the client device, the key request comprising an indicator of an authentication target.

In an instance in which the authentication target is the client device itself, the indicator of the authentication target may comprise an identifier of the client device. Some examples of an identifier of the client device may include a media access control (MAC) address of the client device, International Mobile Equipment Identity (IMEI) number, electronic serial number (ESN), and or other token identifying the device.

In an instance in which the authentication target is a user of the client device, the indicator of the authentication target may comprise credentials of the user, such as a username and/or password, a biometric input (e.g., a fingerprint, iris scan, facial recognition, etc.), or other credentials identifying the user.

In response to receiving the key request, the key depot device may then authenticate the authentication target of the key request. For example, the key depot device may authenticate the authentication target to confirm that the user and/or device is an authentic device approved to receive symmetric key(s) from the key depot device. In this regard, as shown by operation 314, the apparatus includes means, such as processor 202, memory 204, authentication circuitry 218, or the like, for authenticating the authentication target based on the indicator of the authentication target included in the key request. In some embodiments, authenticating the authentication target may comprise matching the indicator of the authentication target to a known indicator. For example, a user's biometric input may be compared with a stored biometric input of the user, a MAC address of the client device may be compared with a stored MAC address of the client device, or the like. A successful authentication of the authentication target may be determined in an instance in which the indicator of the authentication target matches the known indicator. At decision point 316, the apparatus 200 includes means, such as processor 202, memory 204, authentication circuitry 218, or the like, for determining whether the indicator of the authentication target matches a known indicator. In other words, the key depot device may determine whether the authentication of the authentication target is successful.

In response to an unsuccessful authentication of the authentication target, the method may continue to operation 318, wherein the apparatus 200 includes means, such as processor 202, memory 204, input-output circuitry 208, communications hardware 206, or the like, for causing presentation of an unsuccessful authentication to the client device. For example, the key depot device may display an error message on a display screen of the key depot device, transmit a notification of the unsuccessful authentication to the client device for display at the client device, and/or the like. The method may then return to operation 310, wherein additional client devices may establish connections to the key depot device to authenticate and receive symmetric keys.

In response to a successful authentication of the authentication target, the method may continue to operation 320, wherein the apparatus 200 includes means, such as processor 202, memory 204, key derivation circuitry 210, or the like, for generating a first symmetric key based at least on a portion of the seed data.

The first symmetric key may be derived by allocating a portion of the seed data to be the first symmetric key. As described above, the seed data may comprise a truly random array of entropy bits (e.g., an array of potentially billions of bits), such that a plurality of symmetric keys may be derived from the seed data. For example, bits positions 0 through 21 of the array may be allocated as the first symmetric key for the client device. When a second client device connects to the key depot device and authenticates at a later time, bit positions 22 through 43 may be allocated as another symmetric key for the second client device. It is to be appreciated that the length of symmetric keys generated from the seed data may comprise any number of bits and may vary in length. Further, symmetric keys may not necessarily be derived from array positions in numerical order beginning at zero, but may be derived based on a predefined agreement between the host device and the key depot device.

Figure 3B:
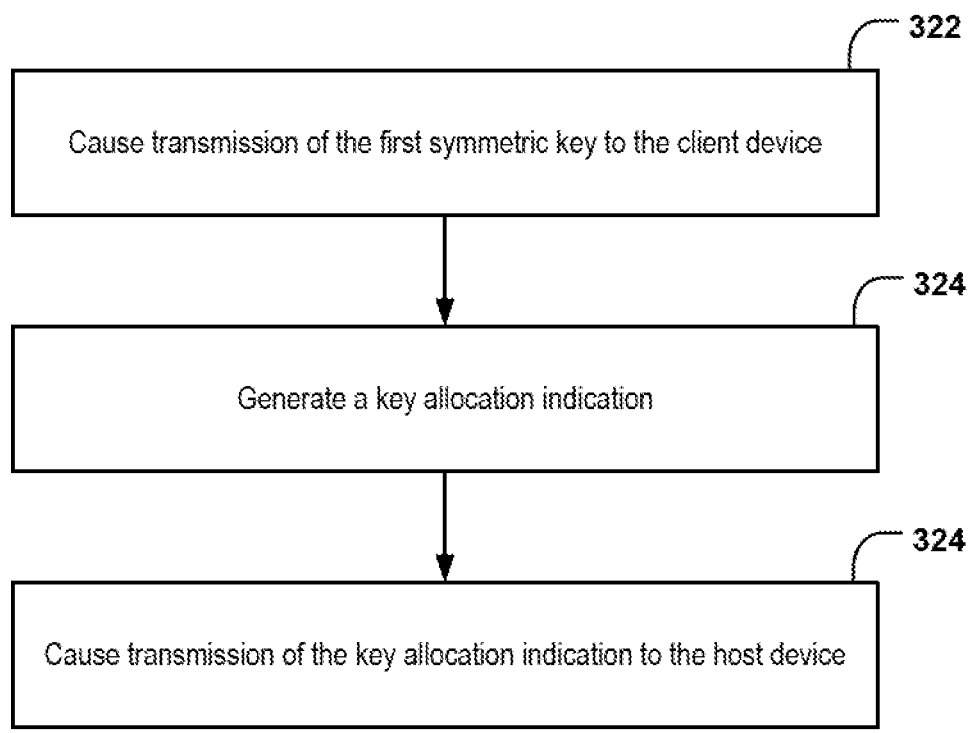
FIG. 3B illustrates a schematic block diagram of example circuitry embodying a device that may perform various operations in accordance with some example embodiments described herein.

Once the first symmetric key is generated, the method may continue to operation 322, as shown in FIG. 3B. In this regard, the apparatus 200 includes means, such as processor 202, memory 204, communications hardware 206, or the like, for causing transmission of the first symmetric key to the client device. Once the client device receives the first symmetric key, the first symmetric key may be used in performing various actions for the client device and/or the user, such as authenticating the user and/or client device when attempting to complete a transaction, gaining access to sensitive resources, and/or the like. The user, having directly received the first symmetric key from the quantum-secure key depot device via the connection between the client device and the key depot device, is assured that the first symmetric key offers a significantly higher level of security and any potential for data secured or transmitted by the first symmetric key to be compromised may be greatly reduced.

Following the generation of the first symmetric key at the key depot device, a key allocation indication may be generated. In this regard, as shown by operation 324, the apparatus 200 includes means, such as processor 202, memory 204, key allocation circuitry 216, or the like, for generating a key allocation indication. The key allocation indication may identify the authentication target (e.g., the key allocation may comprise the identifier of the client device and/or the user) and also comprise an indication of the generation of the first symmetric key. Once generated, the key allocation indication may be transmitted to the host device to allow the host device to know that a symmetric key was generated for that particular client device. As shown by operation 326, the apparatus 200 includes means, such as processor 202, memory 204, communications hardware 206, or the like, for causing transmission of the key allocation indication to the host device. Advantageously, the key allocation indication does not provide the first symmetric key in the transmission, but rather an indication that the first symmetric key was generated. The host device, having the same seed data as the key depot device, can derive the first symmetric key according to a predefined agreement between the host device and the key depot device on how to derive symmetric keys.

It is to be appreciated that in some embodiments, the key allocation indication may be generated and/or transmitted to the host device prior to the key depot device transmitting the first symmetric key to the client device. In some embodiments, the key allocation indication may be encrypted (e.g., using the initial symmetric key) prior to being transmitted to the host device.

Figure 4A:
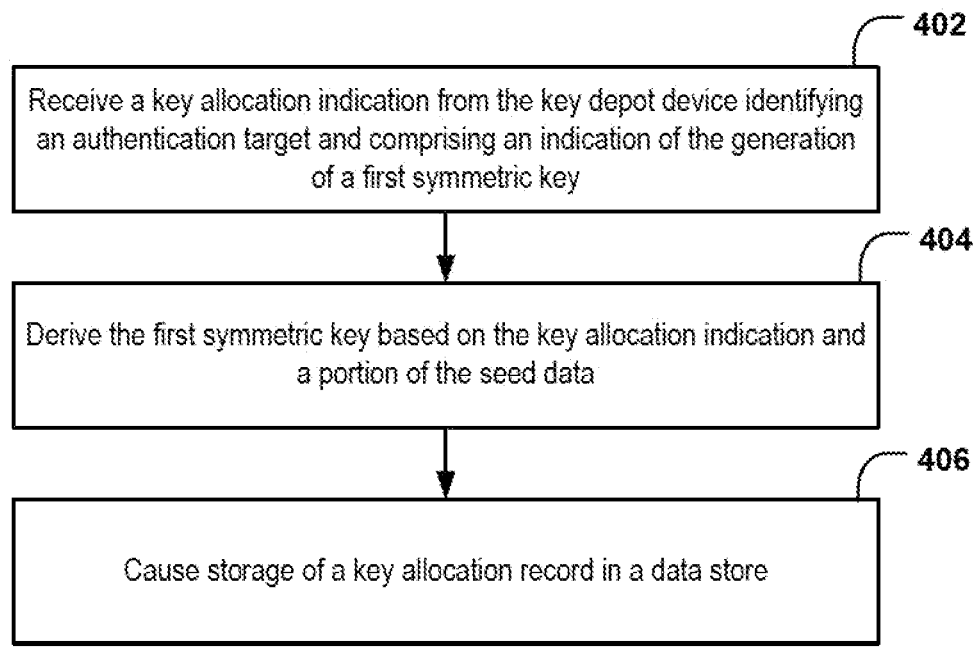
FIG. 4A illustrates an example flowchart of operations performed by a host device to securely distribute symmetric keys, in accordance with some example embodiments described herein.

Turning to FIG. 4A, example operations (e.g., as performed by a host device 102) are shown for securely distributing symmetric keys. As described above in connection with operations 302 and 304 of FIG. 3A, the host device 102 may generate an initial symmetric key based on an entangled particles set. In some embodiments, the host device may also generate seed data, which may then be transmitted to the key depot device (e.g., after having been encrypted using the initial symmetric key).

As shown by operation 402, the apparatus 200 includes means, such as processor 202, memory 204, communications hardware 206, or the like, for receiving a key allocation indication from the key depot device. As described above, the key allocation indication may identify an authentication target (e.g., a client device or a user of the client device) and may comprise an indication of the generation of the first symmetric key. In this regard, the host device is informed by the key allocation indication as to which device and/or user has been given a symmetric key.

As shown by operation 404, the apparatus 200 includes means, such as processor 202, memory 204, key derivation circuitry 210, or the like, for deriving the first symmetric key based on the key allocation indication and a portion of the seed data. For example, as the key depot generated the first symmetric key from a particular portion of the seed data, the host device may derive the first symmetric key from the same portion of the seed data. In some embodiments, the host device may automatically know what portion of the seed data to use based on a key derivation counter. For example, a counter may be employed to track how many key allocation indications are received from the key depot device, and the host device may determine what portion of the seed data to derive the first symmetric key from based on the status of the counter. For example, if the key allocation indication is the first key allocation indication received from the key depot device, the host device may automatically determine to use a first portion of the seed data spanning positions 0 to 21 of the array of bits in the seed data. In this regard, the key allocation need not contain the actual symmetric key, thus avoiding any potential for the first symmetric key to be compromised during transmission of the key allocation indication from the key depot device to the host device.

In some embodiments, the key allocation indication may be encrypted using the initial symmetric key before being transmitted to the host device, and the host device may decrypt the key allocation indication to access the information contained in the key allocation indication. In this regard, the apparatus 200 includes means, such as processor 202, memory 204, data protection circuitry 212, or the like, for decrypting a key allocation indication.

Once the key allocation indication is received and the first symmetric key is derived, a data store associated with the host device may be updated to reflect an association of the first symmetric key with the authentication target contained in the key allocation indication. To do so, a key allocation record may be created in a data store associated with the host device. In this regard, the apparatus 200 includes means, such as processor 202, memory 204, key allocation circuitry 216, or the like, for generating a key allocation record. The key allocation record comprising an association of the first symmetric key and the indicator associated with the authentication target. As one example, the key allocation record may be stored in storage device 102B. In this regard, as shown by operation 406, the apparatus 200 includes means, such as processor 202, memory 204, key allocation circuitry 216, or the like, for causing storage of a key allocation record in a data store.

Figure 4B:
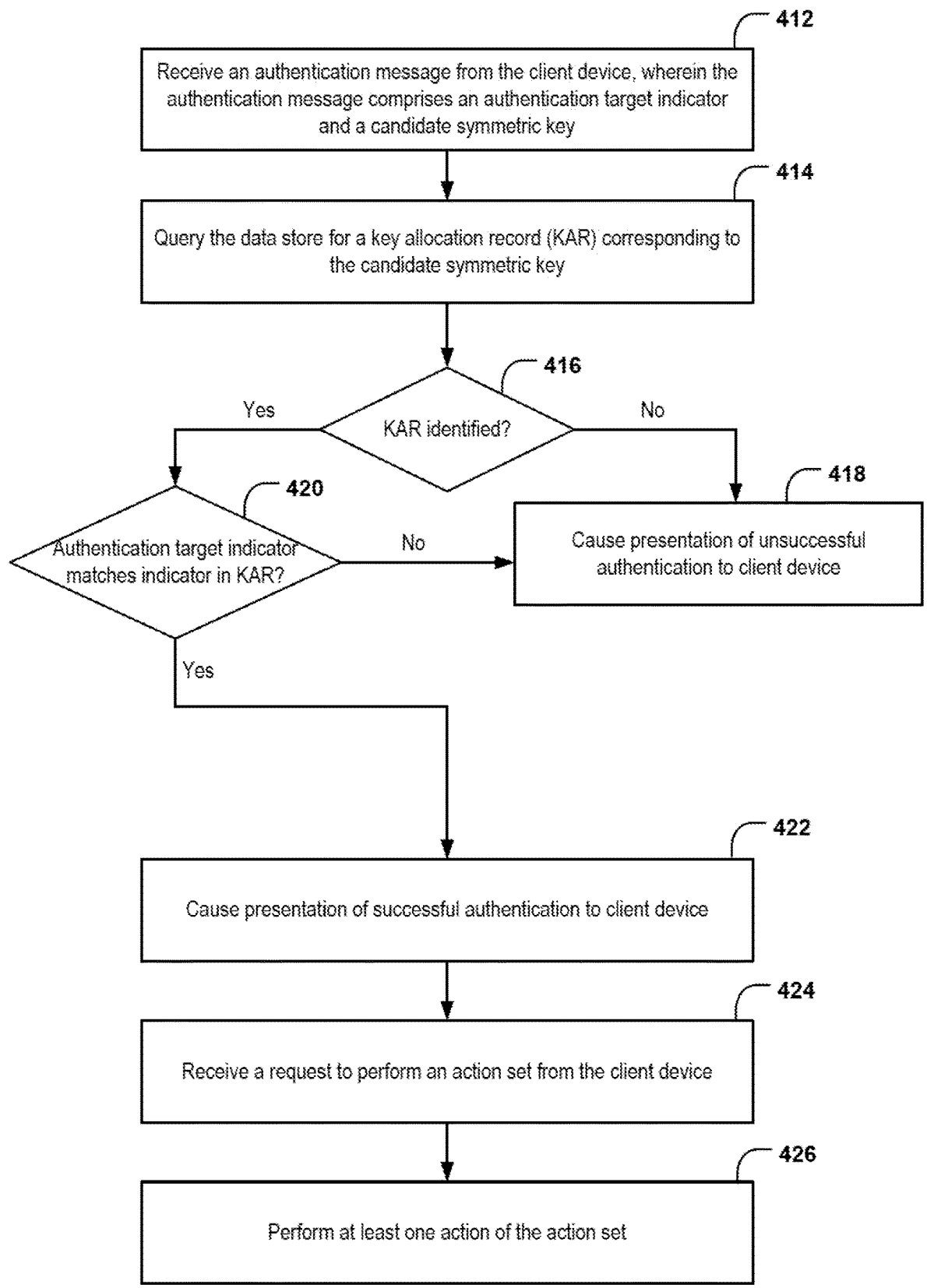
FIG. 4B illustrates an example flowchart of operations performed by a host device to authenticate a client device using a key allocation record, in accordance with some example embodiments described herein.

Once the key allocation record is stored, the key allocation record may be used in authenticating the client device or user of the client device (e.g., at a later time). Turning to FIG. 4B, example operations (e.g., as performed by the host device 102) are shown for authenticating a client device using a key allocation record.

As shown by operation 412, the apparatus 200 includes means, such as processor 202, memory 204, communications hardware 206, or the like, for receiving an authentication message from the client device. The authentication message may comprise an authentication target indicator and a candidate symmetric key. For example, in some embodiments, the authentication message may comprise a request by the client device to authenticate the client device or the user of the client device in order for the client device or the user of the client device to perform an action (e.g., execute a transaction, access sensitive data, or the like). The authentication target indicator may indicate what is needing to be authenticated (e.g., an identifier of the client device or credentials of the user). For example, the authentication target indicator may include the MAC address of the client device, a biometric input of the user, or the like. The candidate symmetric key may be a symmetric key provided by the client device as a candidate for authentication. If the host device can match the candidate symmetric key to a stored key allocation record, and if that stored key allocation record contains an indicator of an authentication target that matches the target authentication indicator of the authentication message, a successful authentication result may be determined. If the host device cannot match the candidate symmetric key to a stored key allocation record, or if a stored key allocation record contains an indicator of an authentication target that does not match the target authentication indicator of the authentication message, an unsuccessful authentication result may be determined. In this regard, the apparatus 200 includes means such as processor 202, memory 204, authentication circuitry 218, or the like, for determining an authentication result for the client device based at least on the candidate symmetric key.

In response to receiving the authentication message, the host device 102 may query a data store to determine if the candidate key included in the authentication message matches a symmetric key of a key allocation record stored in the data store. In this regard, at operation 414, the apparatus 200 includes means, such as processor 202, memory 204, authentication circuitry 218, or the like, for querying the data store for a key allocation record corresponding to the candidate symmetric key. At decision point 416, it may be determined whether a key allocation record corresponding to the candidate symmetric key has been identified.

If a key allocation record corresponding to the candidate symmetric key cannot be identified, the method may continue to operation 418, wherein the apparatus 200 includes means, such as processor 202, memory 204, input-output circuitry 208, communications hardware 206, or the like, for causing presentation of an unsuccessful authentication to the client device. For example, the host device 102 may cause transmission of a notification of the unsuccessful authentication to the client device for display at the client device.

If a key allocation record corresponding to the candidate symmetric key is identified, the method may continue to operation 420, wherein the apparatus 200 includes means, such as processor 202, memory 204, input-output circuitry 208, communications hardware 206, or the like, for confirming whether the authentication target indicator matches an indicator included in the key allocation record. For example, if the MAC address of the client device matches the MAC address of the key allocation record associated with the candidate symmetric key, a successful authentication may be determined.

If the authentication target indicator does not match the indicator included in the key allocation record, the method may continue to operation 418, wherein the host device may cause presentation of an unsuccessful authentication to the client device (e.g., via a notification sent to the client device for display).

If the authentication target matches the indicator included in the key allocation record, the method may continue to operation 422, wherein the apparatus 200 includes means, such as processor 202, memory 204, input-output circuitry 208, communications hardware 206, or the like, for causing presentation of a successful authentication to the client device. For example, the host device may cause transmission of a notification of the unsuccessful authentication to the client device for display at the client device.

As shown by operation 424, the apparatus 200 includes means, such as processor 202, memory 204, communications hardware 206, or the like, for receiving a request to perform an action set from the client device. For example, the client device may send a request to the host to perform one or more actions, such as, for example, allow the client device to access sensitive data (e.g., log into an online banking account or the like), complete a transaction, or other similar actions. The host device, having determined a positive authentication status of the client device based on the candidate key provided by the client device in the authentication message may perform one or more actions of the action set based on the positive authentication status. In this regard, as shown by operation 426, the apparatus includes means, such as processor 202, memory 204, action circuitry 220, or the like, for performing at least one action of the action set.

Figure 5A:
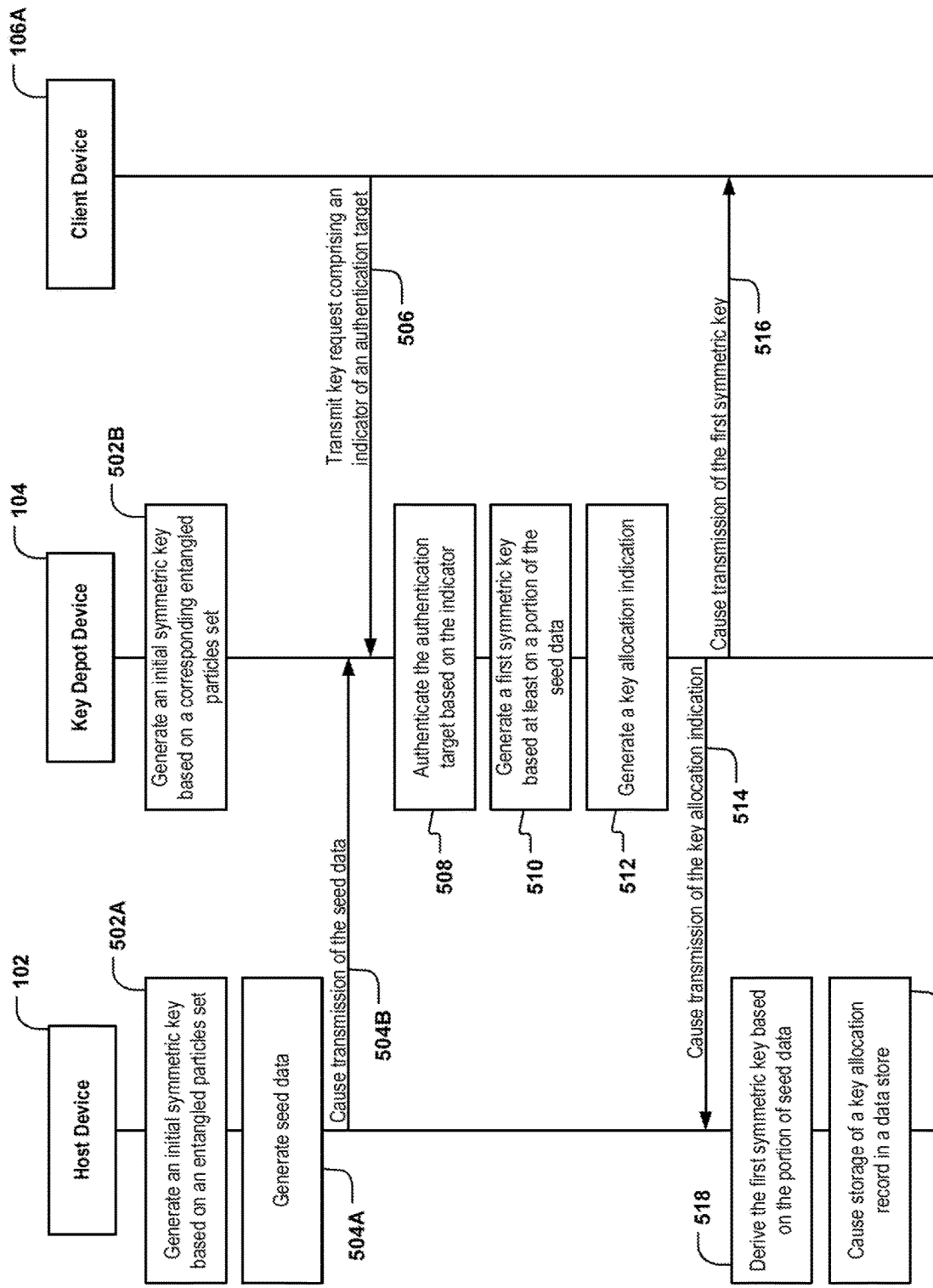
FIG. 5A illustrates an example swim lane diagram of operations for securely distributing symmetric keys, in accordance with some example embodiments described herein.
Figure 5B:
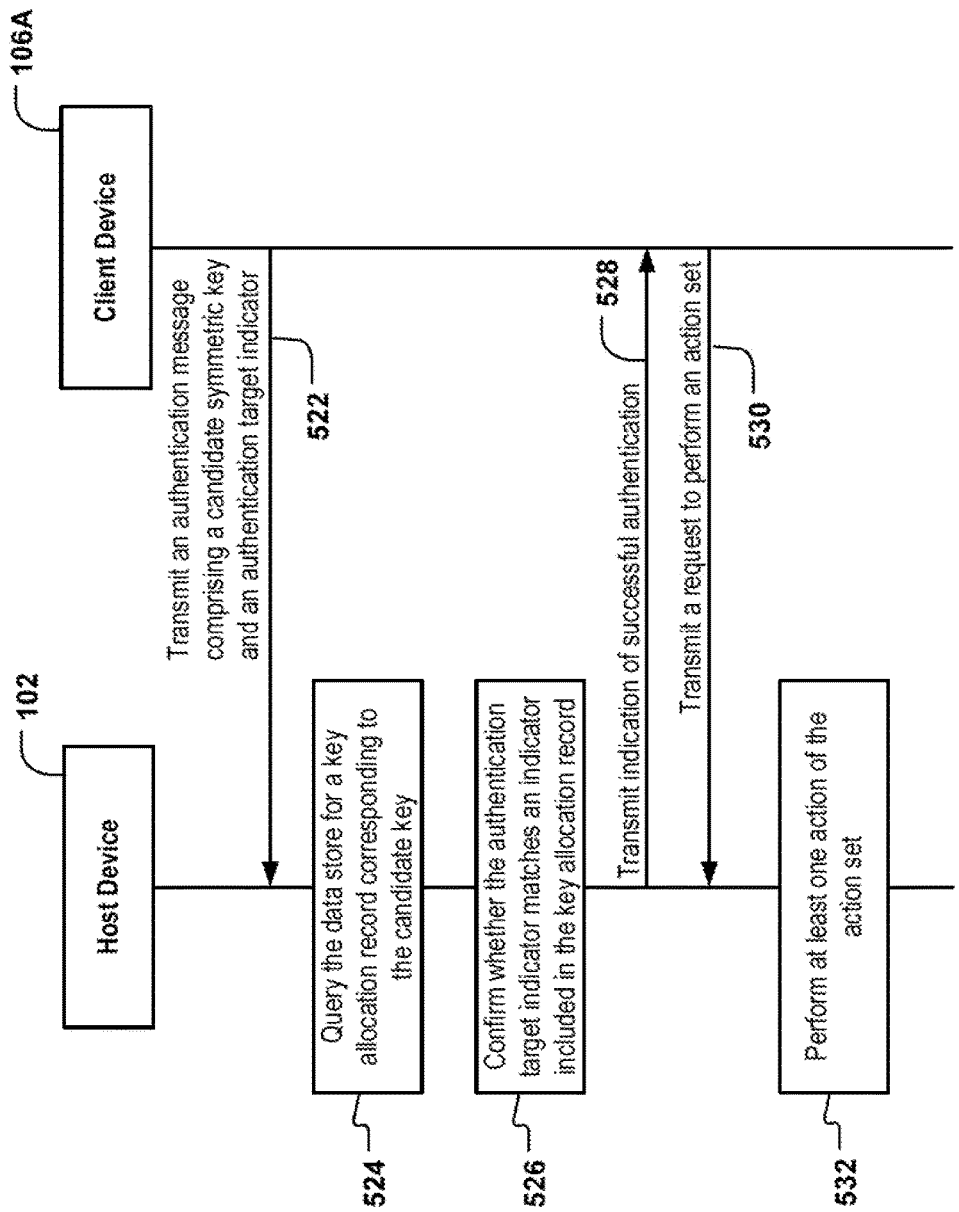
FIG. 5B illustrates an example swim lane diagram of operations for authenticating a client device using a key allocation record, in accordance with some example embodiments described herein.

FIGS. 5A and 5B show swim lane diagrams illustrating example operations (e.g., as described above in connection with FIGS. 3A-4B) performed by components of the environment depicted in FIG. 1 to product various benefits from example embodiments. In these figures, operations performed by a host device 102 are shown along the line extending from the box labeled "host device," operations performed by a key depot device 104 are shown along the line extending from the box labeled "key depot device," and operations performed by a client device 106A are shown along the line extending from the box labeled "client device." Operations impacting multiple devices, such as data transmissions between the devices, are shown using arrows extending between these lines. Generally, the operations are ordered temporally with respect to one another. However, it will be appreciated that the operations may be performed in other orders from those illustrated herein.

Turning first to FIG. 5A, at operation 502A, the host device 102 generates an initial symmetric key based on an entangled particles set. Similarly, at operation 502B, the key depot device 104 also generates the initial key based on a corresponding entangled particles set. At operation 504A, the host device 102 generates seed data, and at operation 504B, the host device 102 causes transmission of the seed data to the key depot device 104 The seed data may be encrypted using the initial symmetric key prior to being transmitted to the key depot device 104.

At operation 506, a client device 106A transmits a key request comprising an indicator of an authentication target to the key depot device 104. The key depot device 104, having received the key request, proceeds to authenticate the authentication target based on the indicator at operation 508. In response to a successful authentication, at operation 518, the key depot device generates a first symmetric key based at least on a portion of the seed data. At operation 512, the key depot device then generates a key allocation indication. As described above, the key allocation indication may identify the client device and include an indication of the generation of the first symmetric key. At operation 514, the key depot device then causes transmission of the key allocation indication to the host device 102. In some embodiments, the key allocation indication may be encrypted using the initial symmetric key prior to being transmitted to the host device 102. At operation 516, the key depot device causes transmission of the first symmetric key to the client device 106A.

At operation 518, the host device 102, having received the key allocation indication, derives the first symmetric key based on the portion of seed data. At operation 520, the host device 102 then causes storage of a key allocation record in a data store. As described above, the key allocation record may comprise an association of the first symmetric key and the indicator associated with the authentication target.

Turning to FIG. 5B, after some time, the client device 106A may transmit an authentication message comprising a candidate symmetric key and an authentication target indicator to the host device 102, as shown in operation 522. At operation 524, the host device may query the data store for a key allocation record corresponding to the candidate key. In response to identifying a key allocation record that corresponds to the candidate key, the host device may then confirm whether the authentication target indicator matches an indicator included in the key allocation record, as shown in operation 526. In response to a successful authentication, at operation 528, the host device 102 may cause transmission of a notification indicating the successful authentication to the client device 106A. At operation 530, the client device may transmit a request to perform an action set. At operation 532, the host device 102 performs at least one action of the action set.

In some embodiments, some of the operations described above in connection with FIGS. 5A and 5B may be modified or further amplified. Furthermore, in some embodiments, additional optional operations may be included. Modifications, amplifications, or additions to the operations above may be performed in any order and in any combination.

Figure 6:
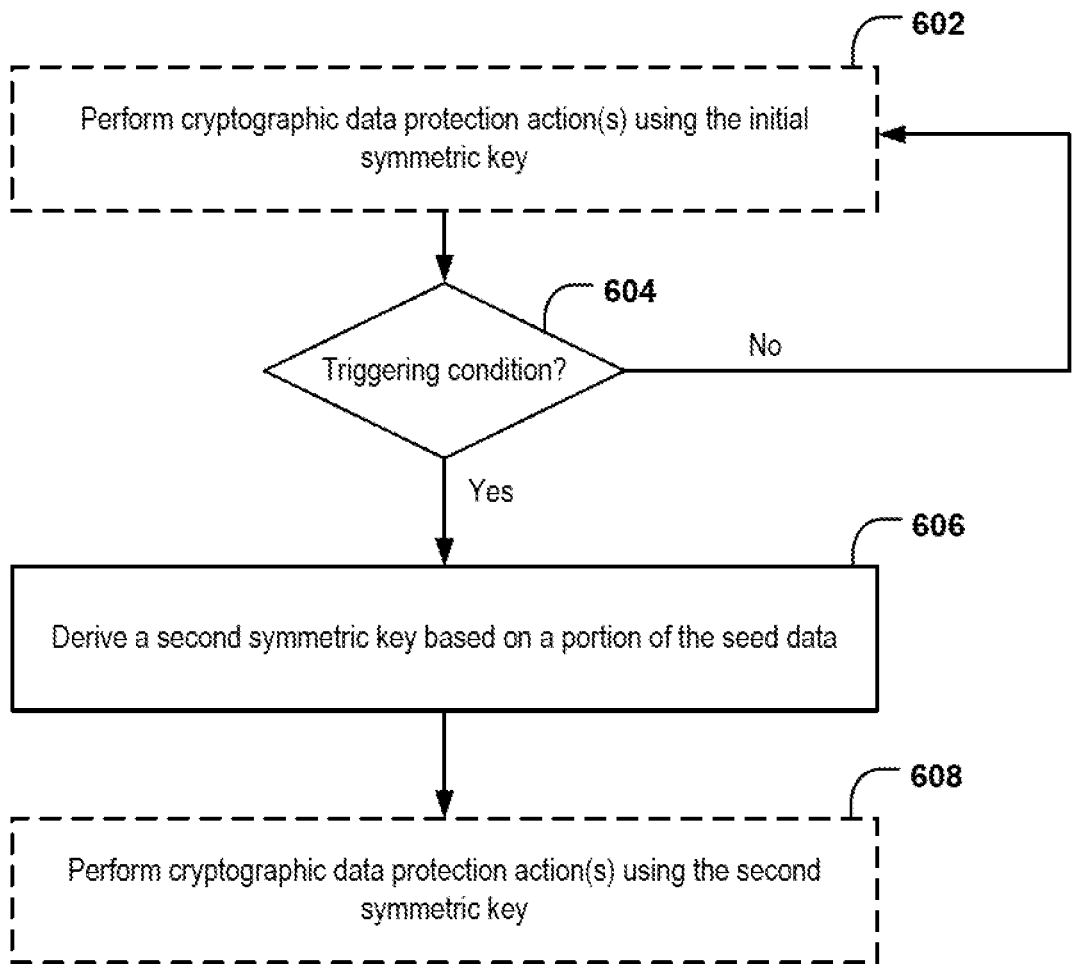
FIG. 6 illustrates an example flowchart of operations for securely rotating keys to maintain secure communication between devices, in accordance with some example embodiments described herein.

Turning to FIG. 6, example operations for securely rotating keys to maintain secure communication between devices are shown. As described above, a host device 102 and a key depot device may utilize an initial symmetric key (e.g., having been generated based on an entangled particles set) to securely communicate with each other. In this regard, as shown by operation 602, the apparatus 200 includes means, such as processor 202, memory 204, data protection circuitry 212, or the like, for performing cryptographic data protection actions using the initial symmetric key. In some embodiments, performing a cryptographic data protection action may comprise encrypting data. In this regard, the apparatus 200 includes means, such as processor 202, memory 204, data protection circuitry 212, or the like, for encrypting data using the initial symmetric key. In some embodiments, performing a cryptographic data protection action may comprise decrypting data. In this regard, the apparatus 200 includes means, such as processor 202, memory 204, data protection circuitry 212, or the like, for decrypting encrypted data using the initial symmetric key.

For example, in some embodiments, the host device 102 may encrypt seed data using the initial symmetric key and cause transmission of the encrypted seed data to the key depot device 104. The key depot device 104 can then decrypt the encrypted seed data using the initial symmetric key. Additionally, the key depot device may encrypt data using the initial symmetric key and cause transmission of the encrypted data to the host device 102. The host device 102 may then decrypt the data using the initial symmetric key and further process the data. For example, the key depot device 104 may encrypt key allocation indications using the initial symmetric key and cause transmission of encrypted key allocation indications to the host device 102 as needed. As the initial symmetric key was distributed to both the host device 102 and key depot device 104 in a quantum-secure manner (e.g., via QKD), it is ensured that the initial symmetric key is known only to the key depot device and the host device, and therefore any data transmitted between the two devices that has been encrypted using the initial symmetric key is known to be secure.

As mentioned above, in some embodiments, symmetric keys may be assigned lifecycles for purposes of security. For example, a lifecycle of a symmetric key may expire after some predefined time has elapsed, and/or after the key has been used to perform a predefined number of cryptographic data protection actions. In conventional implementations, each time a symmetric key reaches the end of an assigned lifecycle, the key must be reestablished, in that a new symmetric key must be generated and distributed to the parties. However, traditionally this is an onerous process, as QKD must be performed again, which may require a human to make another trip to each device (which may be distant from each other) with a KLD to inject a new symmetric key into the devices. Advantageously, rather than performing QKD each time a symmetric key used for secure communication between the host device and the key depot device expires, embodiments herein may utilize the seed data shared between the host device and the key device to derive a new symmetric key to maintain secure communication between the devices.

As shown by decision point 604, the apparatus 200 includes means, such as processor 202, memory 204, communications hardware 206, data protection circuitry 212, or the like, for determining whether a triggering condition has occurred. In some embodiments, a triggering condition may comprise a predefined amount of cryptographic data protection actions having been performed using the initial symmetric key (e.g., as defined by the lifecycle of the key). Additionally, or alternatively, in some embodiments, a triggering condition may comprise a predefined amount of time having elapsed since the deriving of the initial symmetric key (e.g., as defined by the lifecycle of the key). In some embodiments, a triggering condition may comprise an update, replacement, or failure of the host device 102 and/or the key depot device 104. For example, an event such as a software and/or firmware update to one or both of the computing devices, a replacement of software and/or hardware, peripheral device(s), and/or the like, a system error and/or reboot of the one or more computing devices may trigger a process to replace the initial symmetric key with a new symmetric key.

If a triggering condition has not yet occurred, the method may return to operation 602, wherein the host device 102 and the key depot device 104 may continue to perform cryptographic data protection actions using the initial symmetric key. However, in an instance in which it is determined that the triggering condition has occurred (e.g., the lifecycle of the initial symmetric key has expired), the method may continue to operation 606, wherein the apparatus 200 includes means, such as processor 202, memory 204, key derivation circuitry 210, or the like, for deriving a second symmetric key based on a portion of the seed data.

Once the second symmetric key has been derived at both the host device 102 and the key depot device 104, the devices may then begin communicating with each other using the second symmetric key. In this regard, as shown by operation 608, the apparatus 200 includes means, such as processor 202, memory 204, data protection circuitry 212, or the like, for performing cryptographic data protection actions using the second symmetric key. For instance, the host device 102 and key depot device 104 may discontinue use of the initial symmetric key and begin securely communicating using the second symmetric key.

In some embodiments, at a later time, once the second symmetric key has expired, the devices may derive a third symmetric key based on another potion of the seed data. The host device 102 and key depot device 104 may then discontinue use of the second symmetric key and begin securely communicating using the third symmetric key. This process may be repeated many times, for hundreds, thousands, or millions of keys.

Figure 7:
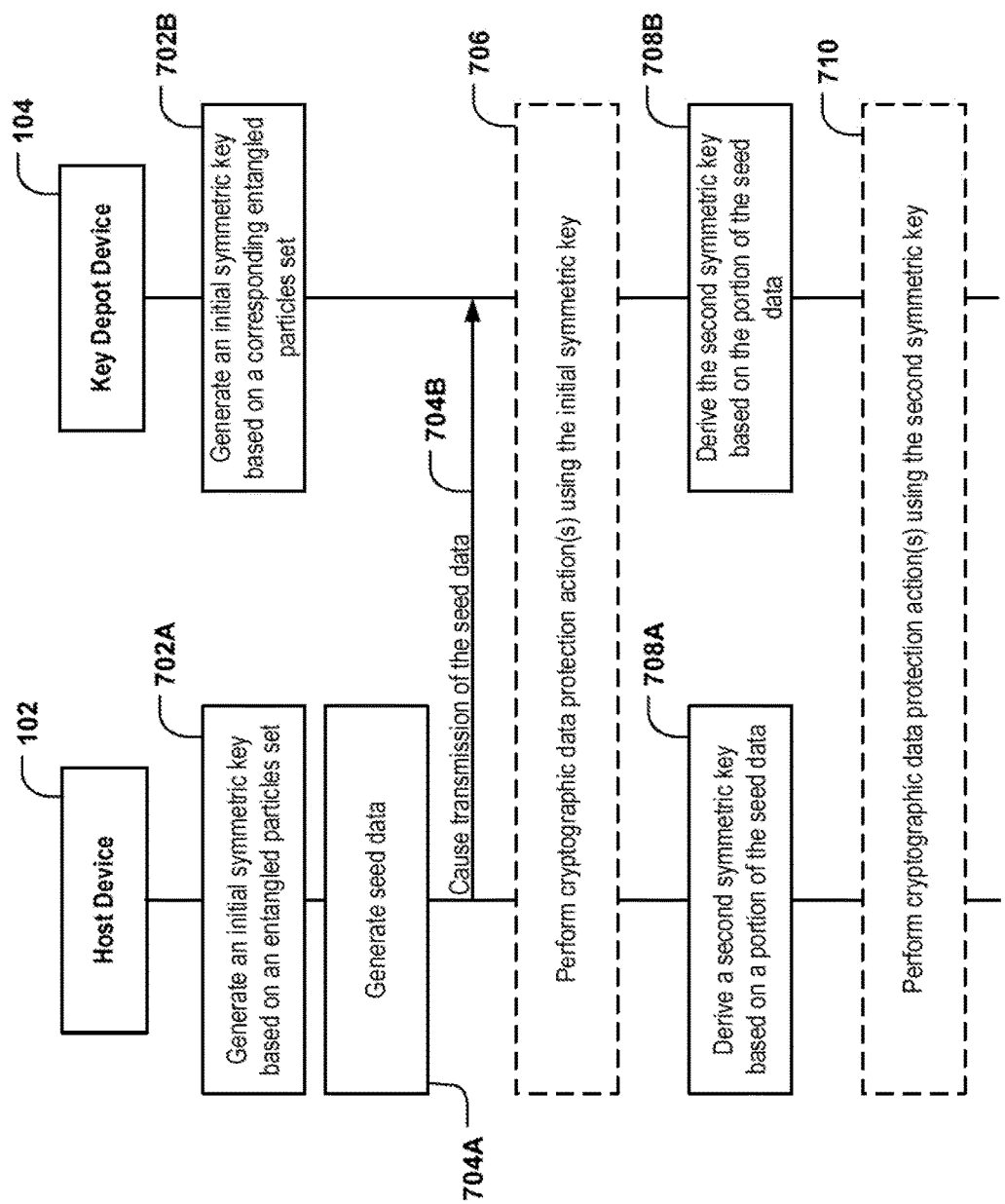
FIG. 7 illustrates an example swim lane diagram of operations for securely rotating keys to maintain secure communication between devices, in accordance with some example embodiments described herein.

FIG. 7 shows a swim lane diagram illustrating example operations (e.g., as described above in connection with FIG. 6) performed by components of the environment depicted in FIG. 1 to product various benefits from example embodiments. In these figures, operations performed by a host device 102 are shown along the line extending from the box labeled "host device," and operations performed by a key depot device 104 are shown along the line extending from the box labeled "key depot device." Generally, the operations are ordered temporally with respect to one another. However, it will be appreciated that the operations may be performed in other orders from those illustrated herein.

At operation 702A, the host device 102 generates an initial symmetric key based on an entangled particles set. Similarly, at operation 702B, the key depot device 104 also generates the initial key based on a corresponding entangled particles set. At operation 704A, the host device 102 generates seed data, and at operation 704B, the host device 102 causes transmission of the seed data to the key depot device 104. The seed data may be encrypted using the initial symmetric key prior to being transmitted to the key depot device 104.

At operation 706, the host device 102 and key depot device 104 perform various cryptographic data protection actions using the initial symmetric key. As shown in operations 708A and 708B, upon expiration of the initial symmetric key, each device derives a second symmetric key based on the same portion of the seed data. At operation 710, the host device 102 and key depot device 104 continue to perform various cryptographic data protection actions using the second symmetric key.

In some embodiments, some of the operations described above in connection with FIG. 7 may be modified or further amplified. Furthermore, in some embodiments, additional optional operations may be included. Modifications, amplifications, or additions to the operations above may be performed in any order and in any combination.

As described above, example embodiments provide methods and apparatuses that enable a more efficient and improved process for securely providing symmetric keys to client devices and also for maintaining secure communication between devices in the event of key lifecycle expiration. Example embodiments thus provide tools that overcome the problems faced in the event of expiration of a symmetric key lifecycle. By avoiding the need to continuously perform key distribution processes that often involve computationally intensive methods and manual tasks including physically secure delivery of keys, example embodiments thus save time and resources, while also eliminating the possibility of human error that has been unavoidable in the past. Moreover, by leveraging a lightweight and easily transmissible key allocation indications to communicate the generation of new symmetric keys, embodiments described herein enable secure communication between devices to be maintained even in times of intermittent connections or low bandwidth environments.

FIGS. 3A-4B and 6 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving, by communications hardware of a key depot device and via quantum key distribution (QKD), an entangled particles set, wherein a corresponding entangled particles set is received by a host device;
generating, by a secure key generator of the key depot device, an initial symmetric key based on the entangled particles set, wherein the initial symmetric key facilitates secure communication between the key depot device and the host device, the host device having also generated the initial symmetric key based on the corresponding entangled particles set;
receiving, by the communications hardware of the key depot device, seed data from the host device, wherein the seed data is encrypted using the initial symmetric key;
establishing, by the communications hardware of the key depot device, a connection to a client device;
generating, by key derivation circuitry of the key depot device, a first symmetric key based at least on a portion of the seed data;
causing transmission, by the communications hardware of the key depot device, of the first symmetric key to the client device;
generating, by key allocation circuitry of the key depot device, a key allocation indication, wherein the key allocation indication identifies an authentication target and comprises an indication of the generation of the first symmetric key, and wherein generating the key allocation indication comprises:
populating, by the key allocation circuitry of the key depot device, the key allocation indication using an indicator of the authentication target and contextual information relating to generation of the first symmetric key, and
encrypting, by data protection circuitry of the key depot device, the key allocation indication using the initial symmetric key prior to causing transmission of the key allocation indication to the host device; and
causing transmission, by the communications hardware of the key depot device, of the key allocation indication to the host device.

2. The method of claim 1, wherein establishing the connection to the client device comprises:
receiving, by the communications hardware of the key depot device, a key request from the client device, wherein the key request from the client device comprises the indicator of the authentication target; and
authenticating, by authentication circuitry of the key depot device, the authentication target based on the indicator,
wherein the key derivation circuitry of the key depot device generates the first symmetric key in response to a successful authentication of the authentication target.

3. The method of claim 1, wherein receiving the seed data comprises:

decrypting, by the data protection circuitry of the key depot device, the seed data using the initial symmetric key.

4. The method of claim 1, wherein the key depot device is installed at a fixed location.

5. The method of claim 1, further comprising:
establishing, by the communications hardware of the key depot device, a second connection to a second client device;
generating, by the key derivation circuitry of the key depot device, a second symmetric key based at least on a second portion of the seed data;
causing transmission, by the communications hardware of the key depot device, of the second symmetric key to the second client device;
generating, by the key allocation circuitry of the key depot device, a second key allocation indication, wherein the key allocation indication identifies the second client device and comprises an indication of the generation of the second symmetric key; and
causing transmission, by the communications hardware of the key depot device, of the second key allocation indication to the host device.

6. The method of claim 5, wherein establishing the second connection to the second client device comprises:
receiving, by the communications hardware of the key depot device, a key request from the second client device, wherein the key request from the second client device comprises an indicator of a second authentication target; and
authenticating, by authentication circuitry, the second authentication target based on the indicator,
wherein the second symmetric key is generated in response to a successful authentication of the second authentication target.

7. An apparatus comprising:
communications hardware of a key depot device configured to receive, via quantum key distribution (QKD), an entangled particles set, wherein a corresponding entangled particles set is received by a host device;
a secure key generator configured to generate an initial symmetric key based on the entangled particles set, wherein the initial symmetric key facilitates secure communication between the key depot device and the host device, the host device having also generated the initial symmetric key based on the corresponding entangled particles set;
wherein the communications hardware is further configured to:
receive seed data from the host device, wherein the seed data is encrypted using the initial symmetric key, and
establish a connection to a client device;
key derivation circuitry of the key depot device configured to generate a first symmetric key based at least on a portion of the seed data; and
key allocation circuitry of the key depot device configured to generate a key allocation indication, wherein the key allocation indication identifies an authentication target and comprises an indication of the generation of the first symmetric key, and wherein the key allocation circuitry is configured to generate the key allocation indication by:
populating the key allocation indication using an indicator of the authentication target and contextual information relating to generation of the first symmetric key, and encrypting, via data protection circuitry, the key allocation indication using the initial symmetric key prior to causing transmission of the key allocation indication to the host device, wherein the communications hardware of the key depot device is further configured to:
- cause transmission of the first symmetric key to the client device; and
- cause transmission of the key allocation indication to the host device.

8. The apparatus of claim 7, wherein the communications hardware is configured to establish the connection to the client device by receiving a key request from the client device, wherein the key request from the client device comprises the indicator of the authentication target; and wherein the apparatus further comprises authentication circuitry configured to authenticate the authentication target based on the indicator; and wherein the key derivation circuitry of the key depot device is configured to generate the first symmetric key in response to a successful authentication of the authentication target.

9. The apparatus of claim 7, wherein the apparatus further comprises the data protection circuitry, wherein the data protection circuitry is configured to:
decrypt the seed data using the initial symmetric key.

10. The apparatus of claim 7, wherein the key depot device is installed at a fixed location.

11. The apparatus of claim 7, wherein the communications hardware is further configured to establish a second connection to a second client device, wherein the key derivation circuitry is further configured to generate a second symmetric key based at least on a second portion of the seed data, wherein the key allocation circuitry is further configured to generate a second key allocation indication, wherein the key allocation indication identifies the second client device and comprises an indication of the generation of the second symmetric key, and wherein the communications hardware is further configured to:
- cause transmission, by the communications hardware of the key depot device, of the second symmetric key to the second client device; and
- cause transmission, by the communications hardware of the key depot device, of the second key allocation indication to the host device.

12. The apparatus of claim 11, wherein the communications hardware establishes the second connection to the second client device by receiving, a key request from the second client device, wherein the key request from the second client device comprises an indicator of a second authentication target; and wherein the apparatus further comprises authentication circuitry configured to authenticate the second authentication target based on the indicator, wherein the second symmetric key is generated in response to a successful authentication of the second authentication target.

13. A computer program product comprising at least one non-transitory computer-readable storage medium storing software instructions that, when executed, cause an apparatus to:
- receive, via quantum key distribution (QKD), an entangled particles set, wherein a corresponding entangled particles set is received by a host device;
- generate an initial symmetric key based on the entangled particles set, wherein the initial symmetric key facilitates secure communication with the host device, the host device having also generated the initial symmetric key based on the corresponding entangled particles set;
- receive seed data from the host device, wherein the seed data is encrypted using the initial symmetric key;
- establish a connection to a client device;
- generate a first symmetric key based at least on a portion of the seed data;
- cause transmission of the first symmetric key to the client device;
- generate a key allocation indication, wherein the key allocation indication identifies an authentication target and comprises an indication of the generation of the first symmetric key, and wherein generating the key allocation indication comprises:
  - populating the key allocation indication using an indicator of the authentication target and contextual information relating to generation of the first symmetric key; and
  - encrypting the key allocation indication using the initial symmetric key prior to causing transmission of the key allocation indication to the host device; and
- cause transmission of the key allocation indication to the host device.

14. The computer program product of claim 13, wherein the software instructions that cause the apparatus to establish the connection to the client device further cause the apparatus to:
- receive a key request from the client device, wherein the key request from the client device comprises the indicator of the authentication target; and
- authenticate the authentication target based on the indicator, wherein the first symmetric key is generated in response to a successful authentication of the authentication target.

* * * * *